United States Patent [19]
Ohno

[11] Patent Number: 6,064,185
[45] Date of Patent: May 16, 2000

[54] CIRCUIT PREVENTING BATTERY FROM OVER DISCHARGING

[75] Inventor: Masahiko Ohno, Tokyo, Japan

[73] Assignee: NEC Corporation, Tokyo, Japan

[21] Appl. No.: 09/288,316

[22] Filed: Apr. 8, 1999

[30] Foreign Application Priority Data

Apr. 9, 1998 [JP] Japan .................................. 10-097353

[51] Int. Cl.$^7$ ....................................................... H02J 7/00
[52] U.S. Cl. ........................................... 320/136; 320/135
[58] Field of Search ..................................... 320/136, 135, 320/127; 323/269, 225; 307/112, 116, 131, 151; 361/160, 161

*Primary Examiner*—Peter S. Wong
*Assistant Examiner*—Lawrence Luk
*Attorney, Agent, or Firm*—Sughrue, Mion, Zinn, Macpeak & Seas, PLLC

[57] ABSTRACT

A circuit preventing battery from over discharging, which is able to prevent battery from over discharging during the time that a DC/DC converter stops the operation, even at the state that the battery is discharged and needs to be recharged, is provided. The circuit preventing battery from over discharging provides a first p type MOS transistor whose gate cut voltage is V1, a second p type MOS transistor whose gate cut voltage V2 and V2<V1, a light emitting section of photocoupler which is connected to the drain of the first p type MOS transistor and the gate of first p type MOS transistor and a light receiving section of photocoupler which connects to the drain of the first p type MOS transistor and the drain of the second p type MOS transistor, and becomes on state at the time when a current flows into the light emitting section of photocoupler. With this construction, by preventing battery from over discharging, making the battery life long and shortening the recharging time are possible.

16 Claims, 7 Drawing Sheets

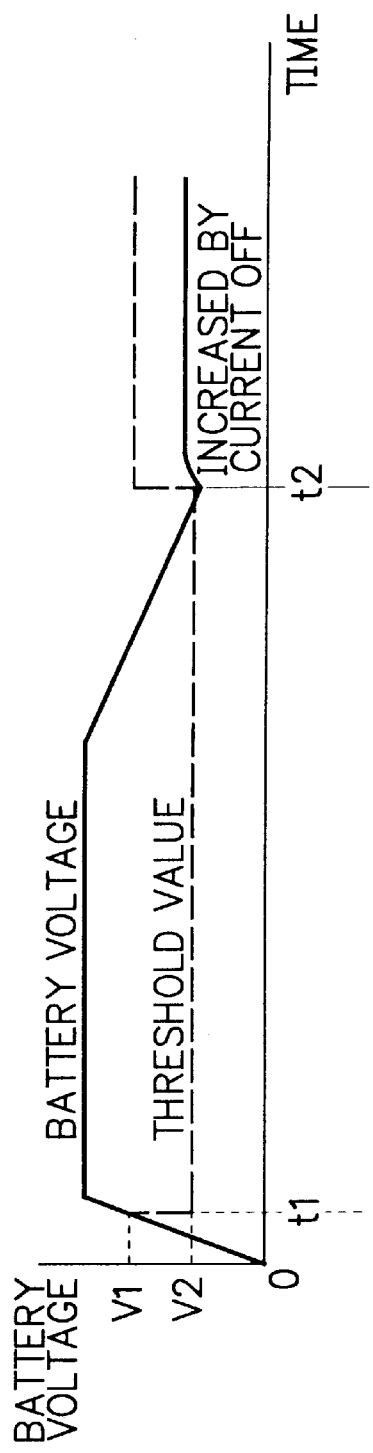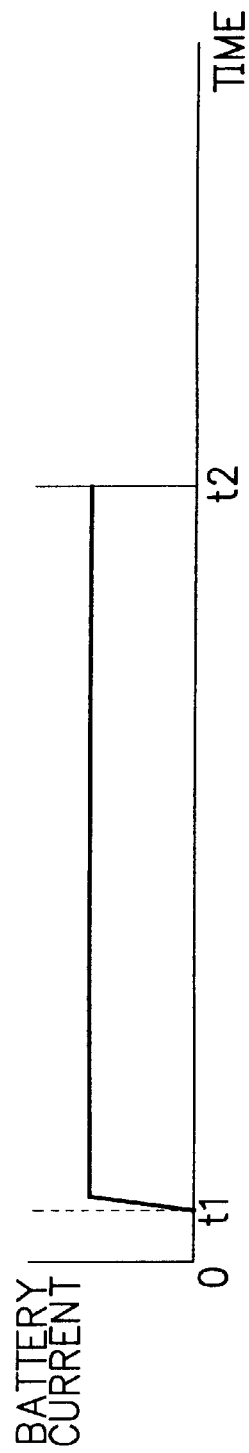

CIRCUIT PREVENTING BATTERY FROM OVER DISCHARGING

BACKGROUND OF THE INVENTION

The present invention relates to a circuit preventing battery from over discharging which in particular is able to make the battery life long.

DESCRIPTION OF THE RELATED ART

As the products become portable and small sized, a DC/DC converter being operated by a battery has been used in many cases.

The battery to operate this DC/DC converter generally decreases the output voltage, corresponding to the decrease of the battery electric charge. Then the voltage to operate the DC/DC converter becomes insufficient, the DC/DC converter stops.

At the time when the discharge current from the battery stops, the voltage drop caused by the internal resistance of the battery stops and the output voltage of the battery increases temporarily and the DC/DC converter again operates, this phenomenon occurs.

With the result of this phenomenon, the DC/DC converter takes out the current from the battery, the voltage drop caused by the internal resistance again occurs and the output voltage of the battery again decreases. Then the voltage to operate the DC/DC converter becomes insufficient and the DC/DC converter again stops. This kind of oscillation phenomenon repeats many times.

A first problem of this phenomenon is that discharge current flows uselessly like a burst from the battery and the battery life is made to be shorten by over discharge that the charge of the battery becomes almost empty by making this phenomenon continue.

A second problem is that the DC/DC converter generally needs a bias current to operate an internal switching transistor and this bias current continuously flows during the operation stop of DC/DC converter and finally the charge of the battery becomes empty.

A third problem is that even the charge of the battery does not become empty, because of the useless discharge, it takes longer time to recharge the battery.

A fourth problem that at the case that an LED is provided to display the state of the power supply from the output voltage of the DC/DC converter, this LED continuously flashes at the time repeating operation of this stopping and operating.

SUMMARY OF THE INVENTION

It is therefore an object of the present invention to provide a circuit preventing battery from over discharging and this circuit is able to prevent the battery from over discharging during the time that the DC/DC converter stops operation.

According to a first aspect of the present invention, for achieving the above mentioned objects, a circuit preventing battery from over discharging which works at an input stage of a DC/DC converter operated by a rechargeable battery provides a first p type MOS transistor whose gate cut voltage is V1 and whose source is connected to the positive electrode of said battery and whose gate is connected to the negative electrode of said battery, a second p type MOS transistor whose gate cut voltage is V2 and V2<V1 and whose source is connected to the positive electrode of said battery and whose gate is connected to the negative electrode of said battery, a current detecting means which connects to the drain of said first p type MOS transistor and the gate of said first p type MOS transistor, and a switching means which connects to the drain of said first p type MOS transistor and the drain of said second p type MOS transistor and becomes on state at the time when a current flows into said current detecting means.

According to a second aspect of the present invention, in the first aspect, said current detecting means provides a light emitting section of photocoupler and said switching means provides a light receiving section of photocoupler which becomes on state by a light emission at the time when a current flows into said light emitting section of photocoupler.

According to a third aspect of the present invention, in the first aspect, said current detecting means provides an electromagnet of a relay and said switching means provides a mechanical contact of a relay which becomes on state at the time when a current flows into said electromagnet of the relay.

According to a fourth aspect of the present invention, in the first aspect, the gate cut voltage V1 of said first p type MOS transistor is larger than the output voltage V at the case that the discharge current of said battery stops and the voltage drop caused by an internal resistance stops and the output voltage increases transitionally.

According to a fifth aspect of the present invention, a circuit preventing battery from over discharging which works at an input stage of a DC/DC converter operated by a rechargeable battery provides a first p type MOS transistor whose gate cut voltage is V1 and whose source is connected to the positive electrode of said battery and whose gate is connected to the negative electrode of said battery, a second p type MOS transistor whose gate cut voltage is V2 and V2<V1 and whose gate is connected to the negative electrode of said battery and whose drain is connected to the drain of said first p type MOS transistor, a current detecting means which connects to the drain of said first p type MOS transistor and the gate of said first p type MOS transistor and a switching means which connects to the source of said first p type MOS transistor and the source of said second p type MOS transistor and becomes on state at the time when a current flows into said current detecting means.

According to a sixth aspect of the present invention, in the fifth aspect, said current detecting means provides a light emitting section of photocoupler, and said switching means provides a light receiving section of photocoupler which becomes on state by a light emission at the time when a current flows into said light emitting section of photocoupler.

According to a seventh aspect of the present invention, in the fifth aspect, said current detecting means provides an electromagnet of a relay and said switching means provides a mechanical contact of a relay which becomes on state at the time when a current flows into said electromagnet of the relay.

According to an eighth aspect of the present invention, in the fifth aspect, the gate cut voltage V1 of said first p type MOS transistor is larger than the output voltage V at the case that the discharge current of said battery stops and the voltage drop caused by an internal resistance stops and the output voltage increases transitionally.

According to a ninth aspect of the present invention, a circuit preventing battery from over discharging which works at an input stage of a DC/DC converter operated by a rechargeable battery provides a first n type MOS transistor whose gate cut voltage is V1 and whose source is connected to the negative electrode of said battery and whose gate is connected to the positive electrode of said battery, a second n type MOS transistor whose gate cut voltage is V2 and V2<V1 and whose gate is connected to the positive electrode of said battery and whose drain is connected to the drain of said first n type MOS transistor, a current detecting means which connects to the drain of said first n type MOS transistor and the gate of said first n type MOS transistor, and a switching means which connects to the source of said first n type MOS transistor and the source of said second n type MOS transistor and becomes on state at the time when a current flows into said current detecting means.

According to a tenth aspect of the present invention, in the ninth aspect, said current detecting means provides a light emitting section of photocoupler and said switching means provides a light receiving section of photocoupler which becomes on state by a light emission at the time when a current flows into said light emitting section of photocoupler.

According to an eleventh aspect of the present invention, in the ninth aspect, said current detecting means provides an electromagnet of a relay and said switching means provides a mechanical contact of a relay which becomes on state at the time when a current flows into said electromagnet of the relay.

According to a twelfth aspect of the present invention, in the ninth aspect, the gate cut voltage V1 of said first n type MOS transistor is larger than the output voltage V at the case that the discharge current of said battery stops and the voltage drop caused by an internal resistance stops and the output voltage increases transitionally.

According to a thirteenth aspect of the present invention, a circuit preventing battery from over discharging which works at an input stage of a DC/DC converter operated by a rechargeable battery provides a first n type MOS transistor whose gate cut voltage is V1 and whose source is connected to the negative electrode of said battery and whose gate is connected to the positive electrode of said battery, a second n type MOS transistor whose gate cut voltage is V2 and V2<V1 and whose gate is connected to the positive electrode of said battery and whose source is connected to the negative electrode of said battery, a current detecting means which connects to the drain of said first n type MOS transistor and the gate of said first n type MOS transistor, and a switching means which connects to the drain of said first n type MOS transistor and the drain of said second n type MOS transistor and becomes on state at the time when a current flows into said current detecting means.

According to a fourteenth aspect of the present invention, in the thirteenth aspect, said current detecting means provides a light emitting section of photocoupler and said switching means provides a light receiving section of photocoupler which becomes on state by a light emission at the time when a current flows into said light emitting section of photocoupler.

According to a fifteenth aspect of the present invention, in the thirteenth aspect, said current detecting means provides an electromagnet of a relay and said switching means provides a mechanical contact of a relay which becomes on state at the time when a current flows into said electromagnet of the relay.

According to a sixteenth aspect of the present invention, in the thirteenth aspect, the gate cut voltage V1 of said first n type MOS transistor is larger than the output voltage V at the case that the discharge current of said battery stops and the voltage drop caused by an internal resistance stops and the output voltage increases transitionally.

BRIEF DESCRIPTION OF THE DRAWINGS

The objects and features of the present invention will become more apparent from the consideration of the following detailed description taken in conjunction with the accompanying drawings in which.

FIG. 3A is a timing chart showing the relation between the time and the battery voltage;

FIG. 3B is a timing chart showing the relation between the time and the battery current;

DESCRIPTION OF THE PREFERRED EMBODIMENTS

Figure 1:
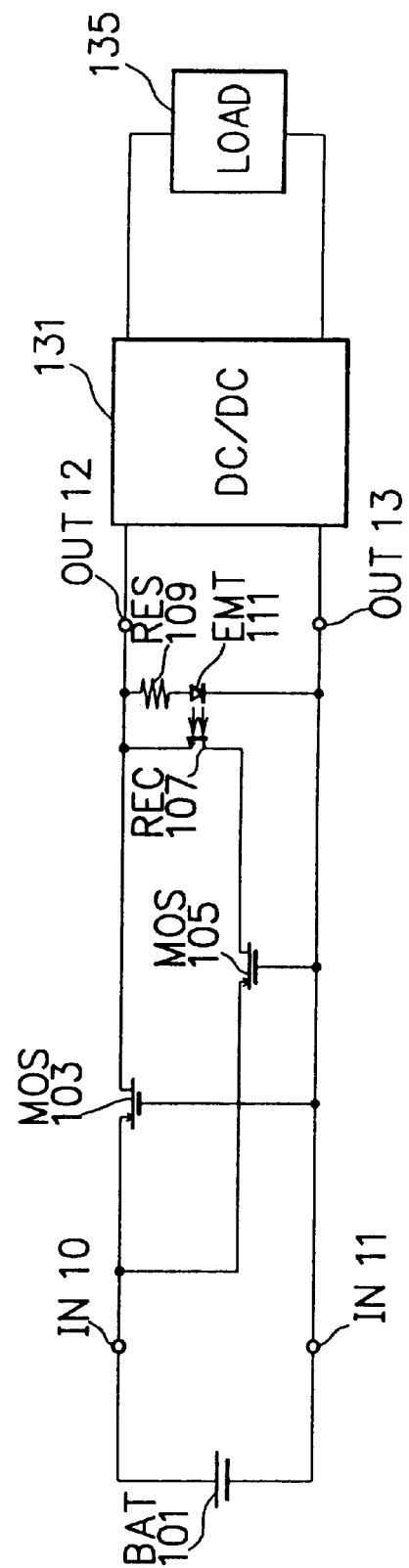
FIG. 1 is a circuit diagram showing a first embodiment of a circuit preventing battery from over discharging of the present invention.

Referring now to the drawings, embodiments of the present invention are explained in detail. FIG. 1 is a circuit diagram showing a first embodiment of a circuit preventing battery from over discharging of the present invention. In this case, a battery, a load and a DC/DC converter are connected to the circuit preventing battery from over discharging.

As shown in FIG. 1, the first embodiment of the circuit preventing battery from over discharging of the present invention is constituted of a battery BAT 101, a first p type MOS transistor 103, a second p type MOS transistor 105, a current detecting means composed of a resistor RES 109 and a light emitting section of photocoupler EMT 111, a light receiving section of photocoupler REC 107, a DC/DC converter 131 and a load 135.

The source of the first p type MOS transistor 103 is connected to the positive electrode of the battery BAT 101 and the gate of the first p type MOS transistor 103 is connected to the negative electrode of the battery BAT 101.

As the same as above, the source of the second p type MOS transistor 105 is connected to the positive electrode of the battery BAT 101 and the gate of the second p type MOS transistor 105 is connected to the negative electrode of the battery BAT 101.

At the place between the drain and the gate of the first p type MOS transistor 103, the current detecting means composed of the resistor RES 109 and the light emitting section of photocoupler EMT 111 connected in series each other is formed.

At the place between the drain of the first p type MOS transistor 103 and the drain of the second p type MOS transistor 105, the light receiving section of photocoupler REC 107 is formed.

The positive electrode of the battery BAT 101 is connected to an input terminal IN 10 and the negative electrode of the battery BAT 101 is connected to an input terminal IN 11.

One end of the DC/DC converter 131 is connected to an output terminal OUT 12 and the other end of the DC/DC converter 131 is connected to an output terminal OUT 13. Moreover, the load 135 is connected to the DC/DC converter 131.

Next, the embodiment of the circuit preventing battery from over discharging of the present invention is explained in more detail. As shown in FIG. 1, the battery BAT 101 is connected to the input terminals IN 10 and IN 11 of the circuit preventing battery from over discharging and the DC/DC converter 131 is connected to the output terminals OUT 12 and OUT 13 of the circuit preventing battery from over discharging.

At the output terminals of the DC/DC converter 131, the load 135 is connected and the power is supplied to the load 135.

The both gates of the first p type MOS transistor 103 and the second p type MOS transistor 105 are connected to the negative electrode of the battery BAT 101 and the both sources of the first p type MOS transistor 103 and the second p type MOS transistor 105 are connected to the positive electrode of the battery BAT 101.

Between the drain and the gate of the first p type MOS transistor 103, as the current detecting means, the light emitting section of photocoupler EMT 111 and the resistor RES 109 limiting the current are connected.

The drain of the second p type MOS transistor 105 is connected to the current detecting means through the light receiving section of photocoupler REC 107 as a switch.

Figure 2:
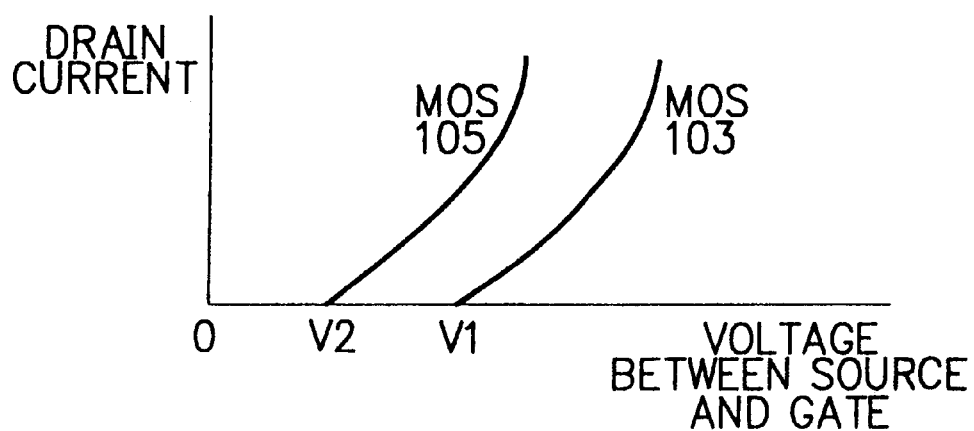
FIG. 2 is a graph showing an example of the characteristics of the first p type MOS transistor and the second p type MOS transistor.

FIG. 2 is a graph showing an example of the characteristics of the first p type MOS transistor 103 and the second p type MOS transistor 105. Referring to FIG. 2, the characteristics are explained in detail.

As shown in FIG. 2, at the first p type MOS transistor 103 and the second p type MOS transistor 105, at the time when the voltage between the source and gate becomes over the predetermined gate cut voltage V1 and V2 respectively, the drain current flows. In the gate cut voltages V1 and V2, the relation V1>V2 is predetermined.

FIGS. 3A and 3B are timing charts showing the first embodiment of the circuit preventing battery from over discharging of the present invention. Referring to FIGS. 1, 3A and 3B, the operation of the first embodiment is explained. FIG. 3A is a timing chart showing the relation between the time and the battery voltage. FIG. 3B is a timing chart showing the relation between the time and the battery current.

The battery BAT 101 is connected to the input terminals IN 10 and IN 11 at the time 0 (zero) and the battery voltage increases gradually after the connection.

The battery voltage increases with the passage of time and first becomes over the gate cut voltage V2 of the second p type MOS transistor 105. At this time, as the battery voltage is over V2, the place between the source and drain of the second p type MOS transistor 105 is on state. However the light receiving section of photocoupler REC 107 is off state, the drain current does not flow in this second p type MOS transistor 105.

After this, the battery voltage increases further and at the time t1, the applied voltage from the battery BAT 101 becomes over V1. With this, the first p type MOS transistor 103 becomes on state.

The gate cut voltage V1 of the first p type MOS transistor 103 is set as a lower value than the battery charged voltage in order to make the first p type MOS transistor 103 on at the time when the battery BAT 101 is fully charged.

By turning on the first p type MOS transistor 103, the current flows into the light emitting section of photocoupler EMT 111 and the light emitting section of photocoupler EMT 111 emits light and as a result the light receiving section of photocoupler REC 107 becomes on.

At this time, the drain current of the second p type MOS transistor 105 flows and the current from the battery BAT 101 is supplied to the DC/DC converter 131 via both MOS transistors. At this time, the currents from both MOS transistors flow into the light emitting section of photocoupler EMT 111.

After this, with the passage of time the battery voltage decreases. At the time when the battery voltage becomes a value between the gate cut voltage V1 of the first p type MOS transistor 103 a nd the gate cut voltage V2 of the second p type MOS transistor 105, the first p type MOS transistor 103 becomes off.

At this time, the first p type MOS transistor 103 is off, however the second p type MOS transistor 105 is still on state, and the light emitting section of photocoupler EMT 111 and the light receiving section of photocoupler REC 107 keep the on state. Then the power supply to the DC/DC converter 131 is continued.

Further the time passes, at the time t2, the battery voltage becomes below the gate cut voltage V2 of the second p type MOS transistor 105, the second p type MOS transistor 105 also becomes off. With this, the power supply to the light emitting section of photocoupler EMT 111 stops and the light receiving section of photocoupler REC 107 becomes off. Therefore, the power supply to the DC/DC converter 131 stops.

At the time when this power supply stops, as mentioned above, the battery BAT 101 stops the discharge current, therefore the voltage drop caused by the internal resistance stops and the output voltage of the battery BAT 101 increases transitionally as shown in FIG. 3A.

However, even the output voltage of the battery BAT 101 increases transitionally, as shown in FIG. 3A, the gate cut voltage V1 of the first p type MOS transistor 103 is set as higher enough than this increase. Therefore the first p type MOS transistor 103 does not become on.

Moreover, there is a possibility that the second p type MOS transistor 105 becomes on state by this voltage increase, however because of no current at the light emitting section of photocoupler EMT 111, the light emitting section of photocoupler EMT 111 does not emit light. As a result the light receiving section of photocoupler REC 107 is off, therefore the drain current of the second p type MOS transistor 105 does not flow.

Therefore, even the output voltage of the battery BAT 101 increases transitionally, the current to the DC/DC converter 131 does not flow. At this state, the MOS transistor has high impedance, therefore the discharge current from the battery BAT 101 is negligible small. With this, the threshold value of the operation of the circuit preventing battery from over discharging of the first embodiment of the present invention becomes the shape shown in FIG. 3A.

After this operation, the battery BAT 101 is charged and the voltage of the battery BAT 101 becomes the charged state, but this charging is not shown. As mentioned above, the first p type MOS transistor 103 and the second p type MOS transistor 105 become on state and the operation of starting the power supply to the DC/DC converter 131 is implemented.

Therefore, at the first embodiment of the circuit preventing battery from over discharging as shown in FIG. 1, even the output voltage of the battery BAT 101 increases transitionally, the first p type MOS transistor 103 does not become on state. With this, the drain current of the second p type MOS transistor 105 does not flow and as a result the useless discharging from the battery BAT 101 is able to be prevented.

Figure 4:
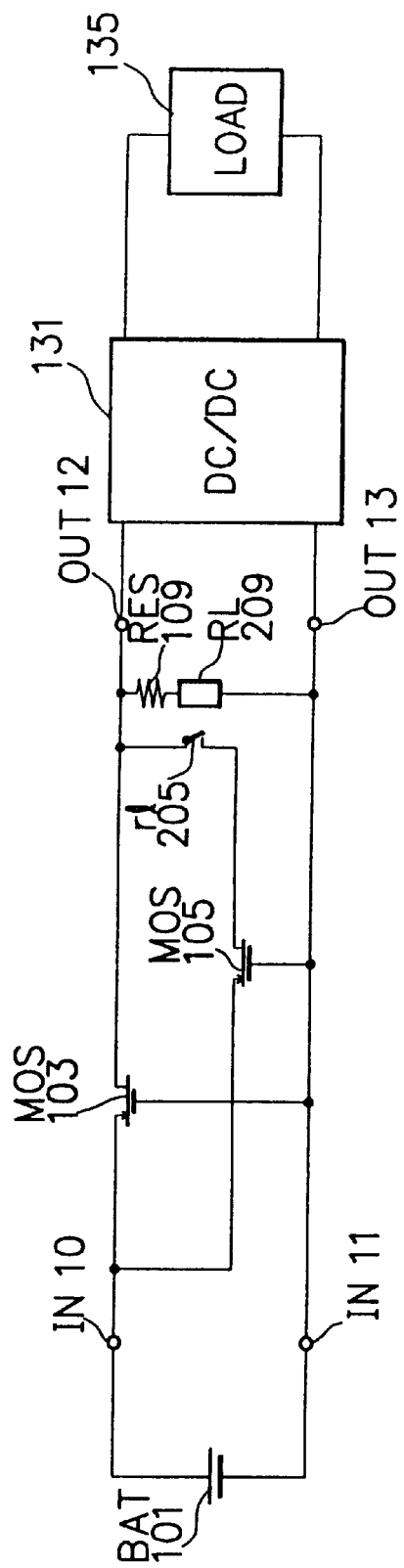
FIG. 4 is a circuit diagram showing a second embodiment of the circuit preventing battery from over discharging of the present invention.

Next, a second embodiment of a circuit preventing battery from over discharging of the present invention is explained. FIG. 4 is a circuit diagram showing the second embodiment of the circuit preventing battery from over discharging of the present invention. In FIG. 4, the circuit preventing battery from over discharging is connected to a battery, a DC/DC converter and a load and the same elements shown in the first embodiment in FIG. 1 have the same sign numbers in this second embodiment.

One difference between the second embodiment and the first embodiment is that the second embodiment provides an electromagnet section of a relay RL 209 as a current detecting means formed between the drain and the gate of the first p type MOS transistor 103 instead of the light emitting section of photocoupler at the first embodiment. The other difference is that the second embodiment provides a mechanical contact of a relay "rl" 205 which becomes current passing state by the current flowing into the electromagnet section of the relay RL 209 as a switching means connecting between the drain of the first p type MOS transistor 103 and the drain of the second p type MOS transistor 105 instead of the light receiving section of photocoupler at the first embodiment. Except mentioned above differences, the others are the same.

At the initial state, that is, the battery BAT 101 is not connected, the mechanical contact of the relay "rl" 205 is open state and the current does not flow. The continuous operation of this mechanical contact of the relay "rl" 205 is the same as the current passing operation of the light receiving section of photocoupler REC 107 of the first embodiment, therefore the same explanation is omitted.

The operation of each element shown in FIG. 4 is the same as the operation shown in FIGS. 1, 3A and 3B. Therefore the same explanation is omitted. However, a photo MOS relay is applicable as a relay using in FIG. 4.

Therefore, the second embodiment shown in FIG. 4 is able to obtain the same effect that the first embodiment has.

Figure 5:
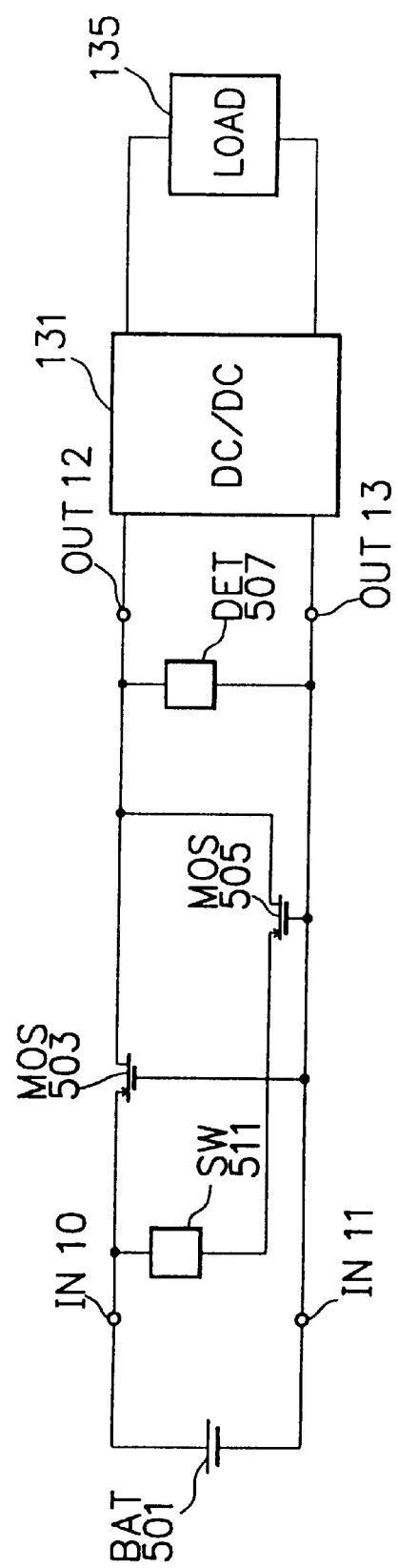
FIG. 5 is a circuit diagram showing a third embodiment of the circuit preventing battery from over discharging of the present invention.

Next, a third embodiment of the circuit preventing battery from over discharging of the present invention is explained. FIG. 5 is a circuit diagram showing the third embodiment of the circuit preventing battery from over discharging of the present invention. In FIG. 5, the circuit preventing battery from over discharging is connected to a battery, a DC/DC converter and a load and the same elements shown in the first embodiment in FIG. 1 have the same sign numbers in this third embodiment.

At the above mentioned first and second embodiments, the switching means is constituted of either the light receiving section of photocoupler or the mechanical contact of the relay and is connected to the drain of the second p type MOS transistor. Even this switching means is connected to the source of the second p type MOS transistor, the same effect is obtained except voltage drop by the receiving section of photocoupler.

As shown in FIG. 5, the third embodiment of the circuit preventing battery from over discharging of the present invention is constituted of a battery BAT 501, a first p type MOS transistor 503, a second p type MOS transistor 505, a current detecting means DET 507, a switching means SW 511, the DC/DC converter 131 and the load 135.

The source of the first p type MOS transistor 503 is connected to the positive electrode of the battery BAT 501 and the gate of the first p type MOS transistor 503 is connected to the negative electrode of the battery BAT 501 as shown in FIG. 5

The drain of the second p type MOS transistor 505 is connected to the drain of the first p type MOS transistor 503 and the gate of the second p type MOS transistor 505 is connected to the negative electrode of the battery BAT 501.

The current detecting means DET 507 is formed at the place between the drain and the gate of the first p type MOS transistor 503. The switching means SW 511 is formed at the place between the source of the first p type MOS transistor 503 and the source of the second p type MOS transistor 505.

The positive electrode of the battery BAT 501 is connected to the input terminal IN 10 and the negative electrode of the battery BAT 501 is connected to the input terminal IN 11.

One end of the DC/DC converter 131 is connected to the output terminal OUT 12 and the other end of the DC/DC converter 131 is connected to the output terminal OUT 13. The load 135 is connected to the DC/DC converter 131.

One combination of the current detecting means DET 507 and the switching means SW 511 shown in FIG. 5 is the combination of the current detecting means which is composed of a resistor RES and a light emitting section of photocoupler EMT connected in series, and the switching means being the light receiving section of photocoupler used at the first embodiment. And the other combination of the current detecting means DET 507 and the switching means SW 511 shown in FIG. 5 is the combination of the current detecting means which is the electromagnet section of the relay, and the switching means being the mechanical contact of the relay which becomes the current passing state by the current flowing at the electromagnet section of the relay used at the second embodiment. Either one of the above mentioned combinations is usable. Further, a photo MOS relay is applicable as a relay.

But mentioned above, the second p type MOS gate cut voltage V2 must be smaller by saturation voltage VCE(sat) of the receiving section of photocoupler. Because the battery BAT output voltage implies between the gate of second p type MOS and the receiving section of photocoupler. The battery output voltage is equal to VCE(sat)+V2. Generally, the VCE(sat) is about 0.2 volt, while V2 is larger than it. So, it can be written as V2+VCE(sat)≈V2. Then, let VCE(sat) be omitted to make the explanation easy below.

Next, the operation of the third embodiment of the circuit preventing battery from over discharging of the present invention is explained referring to FIG. 5. In this explanation, the light receiving section of photocoupler is used as the switching means SW 511, the resistor and the light emitting section of photocoupler connected in series is used as the current detecting means DET 507. That is the above mentioned the electromagnet of the relay is used as the current detecting means and the mechanical contact of the relay which becomes current passing state by the current flowing at the electromagnet of the relay is used as the switching means is applicable.

First, at the time 0 (zero), the battery BAT 501 is connected to the input terminals IN 10 and IN 11 and the battery voltage increases gradually.

The battery voltage increases with the passage of time and becomes over the gate cut voltage V2 of the second p type MOS transistor 505. At this time, the battery voltage is over V2, however the first p type MOS transistor 503 is off state and the light receiving section of photocoupler forming the switching means SW 511 is off state, therefore the drain current of the second p type MOS transistor 505 does not flow.

After this, the battery voltage increases further and at the time t1 the applied voltage from the battery BAT 501 becomes over V1 and the first p type MOS transistor 503 becomes on state.

In this, the gate cut voltage V1 of the first p type MOS transistor 503 is set to the lower value of the charged battery voltage in order to make the first p type MOS transistor 503 on at the time when the battery BAT 501 is fully charged.

The current flows at the light emitting section of photocoupler forming the current detecting means DET 507 by that the first p type MOS transistor 503 becomes on and the light emitting section of photocoupler emits light. As a result, the light receiving section of photocoupler forming the switching means SW 511 becomes on.

At this time, the drain current of the second p type MOS transistor 505 flows and the current from the battery BAT 501 is supplied to the DC/DC converter 131 via both MOS transistors. At this time the current from both MOS transistors flows into the light emitting section of photocoupler.

After this, with the passage of time, the battery voltage decreases and becomes the value between the gate cut voltage V1 of the first p type MOS transistor 503 and the gate cut voltage V2 of the second p type MOS transistor 505, and then the first p type MOS transistor 503 becomes off.

At this time, the first p type MOS transistor 503 is off, however the second p type MOS transistor 505 is still on. Therefore the light emitting section of photocoupler forming the current detecting means DET 507 and the light receiving section of photocoupler forming the switching means SW 511 keep on state and the power supply to the DC/DC converter 131 is continued.

Further the time passes and at the time t2 the battery voltage becomes below the gate cut voltage V2 of the second p type MOS transistor 505, with this the second p type MOS transistor 505 also becomes off. Corresponding to this, the power supply to the light emitting section of photocoupler forming the current detecting means DET 507 stops and the light receiving section of photocoupler forming the switching means SW 511 becomes off and the power supply to the DC/DC converter 131 stops.

At the time when this power supply stops, as mentioned above, the discharge current of the battery BAT 501 stops, therefore the voltage drop caused by the internal resistance stops and the output voltage of the battery BAT 501 increases transitionally.

However, even the output voltage of the battery BAT 501 increases transitionally, the gate cut voltage V1 of the first p type MOS transistor 503 is set to be the value over this increase, therefore the first p type MOS transistor 503 does not become on.

Moreover, there is no possibility that the second p type MOS transistor 505 becomes on by this voltage increase. Because the current does not flow into the light emitting section of photocoupler forming the current detecting means DET 507, the light emitting section of photocoupler does not emit light. As a result, the light receiving section of photocoupler forming the switching means SW 511 is off, the drain current of the second p type MOS transistor 505 does not flow.

Therefore, even the output voltage of the battery BAT 501 increases transitionally, the current does not flow into the DC/DC converter 131. At this state, the MOS transistor has high impedance, therefore the discharge current from the battery BAT 501 is negligible small.

After this, the battery is charged by the method not mentioned in FIG. 5 and the battery is fully charged. Then the first p type MOS transistor 503 and the second p type MOS transistor 505 become on, and the power supply to the DC/DC converter 131 is started.

At the third embodiment of the circuit preventing battery from over discharging of the present invention shown in FIG. 5, even the output voltage of the battery BAT 501 increases transitionally, the first p type MOS transistor 503 does not become on. Therefore the drain current of the second p type MOS transistor 505 does not flow, as a result, the useless discharging from the battery BAT 501 is able to be prevented.

Therefore, the third embodiment in which the switching means SW 511 is provided at the place between the source of the first p type MOS transistor 503 and the source of the second p type MOS transistor 505 is able to obtain the same effect as the first embodiment.

Figure 6:
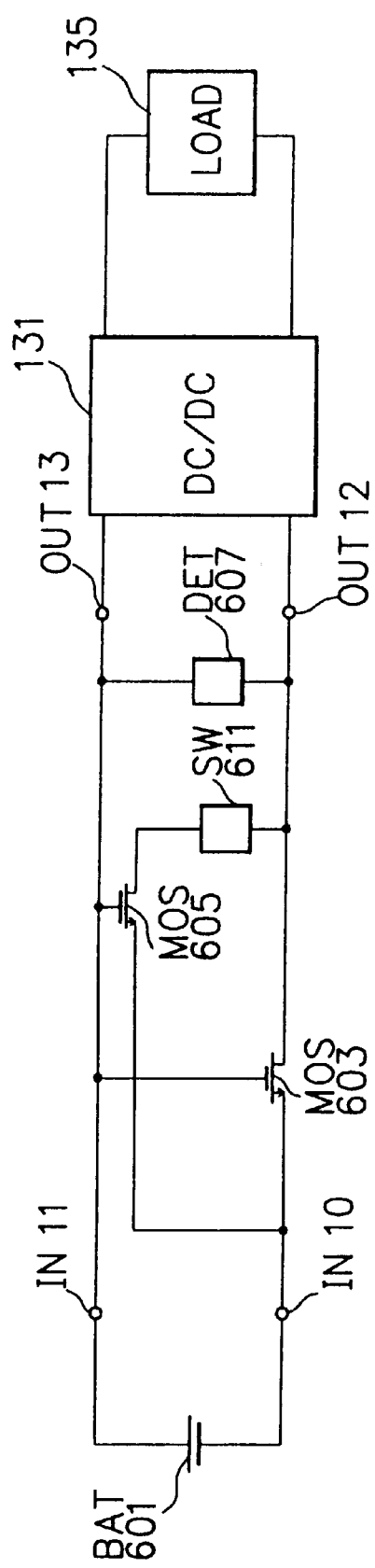
FIG. 6 is a circuit diagram showing a fourth embodiment of the circuit preventing battery from over discharging of the present invention.
Figure 7:
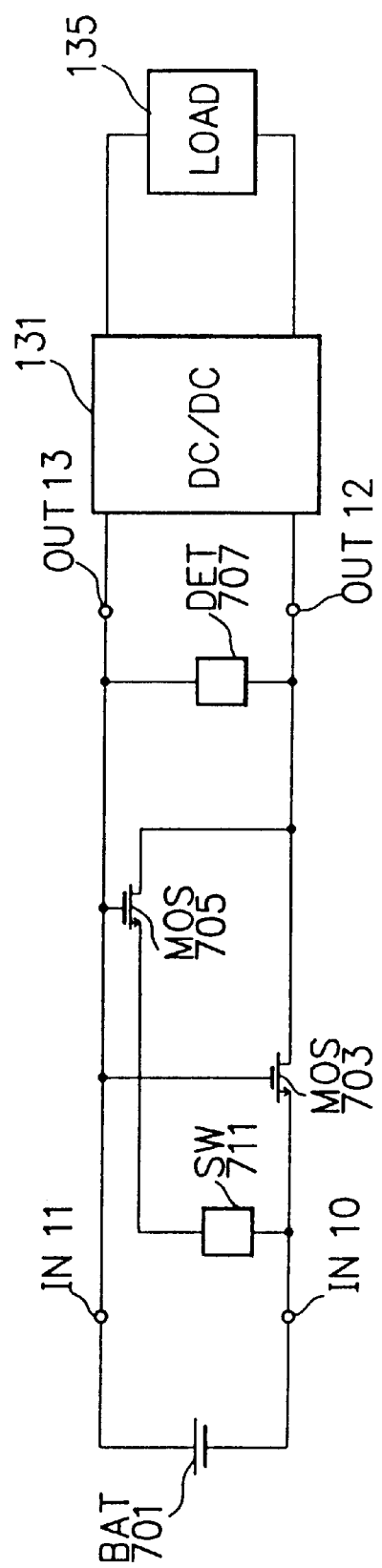
FIG. 7 is a circuit diagram showing a fifth embodiment of the circuit preventing battery from over discharging of the present invention.

At the explanations of the first, second and third embodiments, the circuit preventing battery from over discharging of the present invention is connected to the positive power supply side of the battery. However it is also possible that the circuit preventing battery from over discharging of the present invention is connected to the negative power supply side of the battery. FIG. 6 is a circuit diagram showing a fourth embodiment of the circuit preventing battery from over discharging of the present invention. FIG. 7 is a circuit diagram showing a fifth embodiment of the circuit preventing battery from over discharging of the present invention. Referring to FIGS. 6 and 7, these embodiments are explained.

Next, a fourth embodiment of the circuit preventing battery from over discharging is explained referring to FIG. 6. FIG. 6 is a circuit diagram showing the fourth embodiment of the present invention. The circuit preventing battery from over discharging of the present invention is connected to a battery, a DC/DC converter and a load via the DC/DC converter. The same elements shown in the first embodiment in FIG. 1 have the same sign numbers in this fourth embodiment.

At the fourth embodiment shown in FIG. 6, a switching means is connected to the drain of the second n type MOS transistor. In this case, the current direction is reverse to the first embodiment, therefore n type MOS transistors are used instead of the p type MOS transistors and the direction of the receiving section of photocoupler is reverse to the first embodiment. The current direction of the light emitting section of photocoupler is the same as the first embodiment.

As shown in FIG. 6, the fourth embodiment of the circuit preventing battery from over discharging is constituted of a battery BAT 601, a first n type MOS transistor 603, a second n type MOS transistor 605, a current detecting means DET 607, a switching means SW 611, the DC/DC converter 131 and the load 135.

The source of the first n type MOS transistor 603 is connected to the negative electrode of the battery BAT 601 and the gate of the first n type MOS transistor 603 is connected to the positive electrode of the battery BAT 601. The source of the second n type MOS transistor 605 is connected to the negative electrode of the battery BAT 601 and the gate of the second n type MOS transistor 605 is connected to the positive electrode of the battery BAT 601.

The current detecting means DET 607 is connected to the drain and the gate of the first n type MOS transistor 603. The switching means SW 611 is connected to the drain of the first n type MOS transistor 603 and the drain of the second n type MOS transistor 605.

The positive electrode of the battery BAT 601 is connected to the input terminal IN 11 and the negative electrode of the battery BAT 601 is connected to the input terminal IN 10. One end of the DC/DC converter 131 is connected to the output terminal OUT 12 and the other end of the DC/DC converter 131 is connected to the output terminal OUT 13. The load 135 is connected to this DC/DC converter 131.

One combination of the current detecting means DET 607 and the switching means SW 611 shown in FIG. 6 is the combination of the current detecting means which is composed of a resistor and a light emitting section of photocoupler connected in series, and the switching means being the light receiving section of photocoupler used at the first embodiment. And the other combination of the current detecting means DET 607 and the switching means SW 611 shown in FIG. 6 is the combination of the current detecting means which is the electromagnet section of the relay, and the switching means being the mechanical contact of the relay which becomes the current passing state by the current flowing at the electromagnet section of the relay used at the second embodiment. Either one of the above mentioned combinations is usable. Further, a photo MOS relay is applicable as a relay.

Next, the operation of the fourth embodiment of the circuit preventing battery from over discharging of the present invention is explained referring to FIG. 6. In this explanation, the light receiving section of photocoupler is used as the switching means SW 611, the resistor and the light emitting section of photocoupler connected in series is used as the current detecting means DET 607. In this fourth embodiment, the use of the combination of the electromagnet of the relay as the current detecting means and the mechanical contact of the relay which becomes current passing state by the current flowing in the electromagnet of the relay as the switching means is applicable.

First, at the time 0 (zero), the battery BAT 601 is connected to the input terminals IN 10 and IN 11 and the battery voltage increases gradually.

The battery voltage increases with the passage of time and becomes over the gate cut voltage V2 of the second n type MOS transistor 605. At this time, because of the battery voltage is over V2, the place between the source and drain of the second n type MOS transistor 605 is on state, however the light receiving section of photocoupler forming the switching means SW 611 is off state, therefore the drain current of the second n type MOS transistor 605 does not flow.

After this, the battery voltage increases further and at the time t1 the applied voltage from the battery BAT 601 becomes over V1 and the first n type MOS transistor 603 becomes on state.

In this, the gate cut voltage V1 of the first n type MOS transistor 603 is set to the lower value of the charged battery voltage in order to make the first n type MOS transistor 603 on at the time when the battery BAT 601 is fully charged.

The current flows at the light emitting section of photocoupler forming the current detecting means DET 607 by that the first n type MOS transistor 603 becomes on and the light emitting section of photocoupler emits light. As a result, the light receiving section of photocoupler forming the switching means SW 611 becomes on.

At this time, the drain current of the second n type MOS transistor 605 flows and the current from the battery BAT 601 is supplied to the DC/DC converter 131 via both MOS transistors. The current from both MOS transistors flows into the light emitting section of photocoupler.

After this, with the passage of time, the battery voltage decreases and becomes the value between the gate cut voltage V1 of the first n type MOS transistor 603 and the gate cut voltage V2 of the second n type MOS transistor 605 and the first n type MOS transistor 603 becomes off.

At this time, the first n type MOS transistor 603 is off, however the second n type MOS transistor 605 is still on. Therefore the light emitting section of photocoupler forming the current detecting means DET 607 and the light receiving section of photocoupler forming the switching means SW 611 keep on state and the power supply to the DC/DC converter 131 is continued.

Further the time passes and at the time t2 the battery voltage becomes below the gate cut voltage V2 of the second n type MOS transistor 605, with this the second n type MOS transistor 605 also becomes off. Corresponding to this, the power supply to the light emitting section of photocoupler forming the current detecting means DET 607 stops and the light receiving section of photocoupler forming the switching means SW 611 becomes off and the power supply to the DC/DC converter 131 stops.

At the time when this power supply stops, as mentioned above, the discharge current of the battery BAT 601 stops, therefore the voltage drop caused by the internal resistance stops and the output voltage of the battery BAT 601 increases transitionally.

However, even the output voltage of the battery BAT 601 increases transitionally, the gate cut voltage V1 of the first n type MOS transistor 603 is set to be the value over this increase, therefore the first n type MOS transistor 603 does not become on.

Moreover, there is a possibility that the second n type MOS transistor 605 becomes on by this voltage increase. However the current does not flow into the light emitting section of photocoupler forming the current detecting means DET 607, therefore the light emitting section of photocoupler does not emit light. As a result, the light receiving section of photocoupler forming the switching means SW 611 is off, therefore the drain current of the second n type MOS transistor 605 does not flow.

Therefore, even the output voltage of the battery BAT 601 increases transitionally, the current does not flow into the DC/DC converter 131. At this state, the MOS transistor has high impedance, therefore the discharge current from the battery BAT 601 is negligible small.

After this, the battery is charged by the method not mentioned in FIG. 6 and the battery is fully charged. Then, the first n type MOS transistor 603 and the second n type MOS transistor 605 become on, and the power supply to the DC/DC converter 131 is started.

At the fourth embodiment of the circuit preventing battery from over discharging of the present invention shown in FIG. 6, even the output voltage of the battery BAT 601 increases transitionally, the first n type MOS transistor 603 does not become on. Therefore the drain current of the second n type MOS transistor 605 does not flow, as a result, the useless discharging from the battery BAT 601 is able to be prevented.

Therefore, at the fourth embodiment of the circuit preventing battery from over discharging of the present invention, at the case that the switching means is provided between the drain of the first n type MOS transistor 603 and the drain of the second n type MOS transistor 605, the same effect of the first embodiment is obtained at the fourth embodiment.

In FIG. 7, the present invention is connected to a battery, a DC/DC converter and a load via the DC/DC converter. The same elements shown in the first embodiment in FIG. 1 have the same sign numbers in this fifth embodiment.

At the fifth embodiment shown in FIG. 7, a switching means is connected to both sources of the MOS transistors. In this case, the current direction in two MOS transistors is reverse to the first embodiment, therefore n type MOS transistors are used instead of the p type MOS transistors and the direction of photocoupler is reverse to the first embodiment. Because position of those components are the opposite side against FIG. 1.

As shown in FIG. 7, the fifth embodiment of the circuit preventing battery from over discharging is constituted of a battery BAT 701, a first n type MOS transistor 703, a second n type MOS transistor 705, a current detecting means DET 707, a switching means SW 711, the DC/DC converter 131 and the load 135.

The source of the first n type MOS transistor 703 is connected to the negative electrode of the battery BAT 701 and the gate of the first n type MOS transistor 703 is connected to the positive electrode of the battery BAT 701. The drain of the second n type MOS transistor 705 is connected to the drain of the first n type MOS transistor 703 and the gate of the second n type MOS transistor 705 is connected to the positive electrode of the battery BAT 701.

The current detecting means DET 707 is connected to the drain and the gate of the first n type MOS transistor 703. The switching means SW 711 is connected to the source of the first n type MOS transistor 703 and the source of the second n type MOS transistor 705.

The positive electrode of the battery BAT 701 is connected to the input terminal IN 11 and the negative electrode of the battery BAT 701 is connected to the input terminal IN 10. One end of the DC/DC converter 131 is connected to the output terminal OUT 12 and the other end of the DC/DC converter 131 is connected to the output terminal OUT 13. The load 135 is connected to this DC/DC converter 131.

One combination of the current detecting means DET 707 and the switching means SW 711 shown in FIG. 7 is the combination of the current detecting means which is composed of a resistor and a light emitting section of photocoupler connected in series, and the switching means being the light receiving section of photocoupler used at the first embodiment. And the other combination of the current detecting means DET 707 and the switching means SW 711 shown in FIG. 7 is the combination of the current detecting means which is the electromagnet section of the relay, and the switching means being the mechanical contact of the relay which becomes the current passing state by the current flowing at the electromagnet section of the relay used at the second embodiment. Either one of the above mentioned combinations is usable. Further, a photo MOS relay is applicable as a relay.

Next, the operation of the fifth embodiment of the circuit preventing battery from over discharging of the present invention is explained referring to FIG. 7. In this explanation, the light receiving section of photocoupler is used as the switching means SW 711, the resistor and the light emitting section of photocoupler connected in series is used as the current detecting means DET 707. That the above mentioned the electromagnet of the relay is used as the current detecting means and the mechanical contact of the relay which becomes current passing state by the current flowing at the electromagnet of the relay is used as the switching means is applicable.

First, at the time 0 (zero), the battery BAT 701 is connected to the input terminals IN 10 and IN 11 and the battery voltage increases gradually.

The battery voltage increases with the passage of time and becomes over the gate cut voltage V2 of the second n type MOS transistor 705. At this time, the battery voltage is over V2 and lower V1. Therefore, the first n type MOS transistor 703 is off state and the light receiving section of photocoupler forming the switching means SW 711 is off state, accordingly the drain current of the second n type MOS transistor 705 does not flow.

After this, the battery voltage increases further and at the time t1 the applied voltage from the battery BAT 701 becomes over V1 and the first n type MOS transistor 703 becomes on state.

In this, the gate cut voltage V1 of the first n type MOS transistor 703 is set to the lower value of the charged battery voltage in order to make the first n type MOS transistor 703 on at the time when the battery BAT 701 is fully charged.

The current flows at the light emitting section of photocoupler forming the current detecting means DET 707 by that the first n type MOS transistor 703 becomes on and the light emitting section of photocoupler emits light. As a result, the light receiving section of photocoupler forming the switching means SW 711 becomes on.

At this time, the drain current of the second n type MOS transistor 705 flows and the current from the battery BAT 701 is supplied to the DC/DC converter 131 via both MOS transistors. The current from both MOS transistors flows into the light emitting section of photocoupler.

After this, with the passage of time, the battery voltage decreases and becomes the value between the gate cut voltage V1 of the first n type MOS transistor 703 and the gate cut voltage V2 of the second n type MOS transistor 705. Then the first n type MOS transistor 703 becomes off.

At this time, the first n type MOS transistor 703 becomes off, however the second n type MOS transistor 705 is still on. Therefore the light emitting section of photocoupler forming the current detecting means DET 707 and the light receiving section of photocoupler forming the switching means SW 711 keep on state and the power supply to the DC/DC converter 131 is continued.

Further the time passes and at the time t2 the battery voltage becomes below the gate cut voltage V2 of the second n type MOS transistor 705, with this the second n type MOS transistor 705 also becomes off. Corresponding to this, the power supply to the light emitting section of photocoupler forming the current detecting means DET 707 stops and the light receiving section of photocoupler forming the switching means SW 711 becomes off and the power supply to the DC/DC converter 131 stops.

At the time when this power supply stops, as mentioned above, the discharge current of the battery BAT 701 stops, therefore the voltage drop caused by the internal resistance stops and the output voltage of the battery BAT 701 increases transitionally.

However, even the output voltage of the battery BAT 701 increases transitionally, the gate cut voltage V1 of the first n type MOS transistor 703 is set to be the value over this increase, therefore the first n type MOS transistor 703 does not become on.

Moreover, there is no possibility that the second n type MOS transistor 705 becomes on by this voltage increase. Because the current does not flow into the light emitting section of photocoupler forming the current detecting means DET 707, the light emitting section of photocoupler does not emit light. As a result, the light receiving section of photocoupler forming the switching means SW 711 is off, therefore the drain current of the second n type MOS transistor 705 does not flow.

Therefore, even the output voltage of the battery BAT 701 increases transitionally, the current does not flow into the DC/DC converter 131. At this state, the MOS transistor has high impedance, therefore the discharge current from the battery BAT 701 is negligible small.

After this, the battery is charged by the method not mentioned in FIG. 7 and the battery is fully charged. Then, the first n type MOS transistor 703 and the second n type MOS transistor 705 become on, and the power supply to the DC/DC converter 131 is started.

At the fifth embodiment of the circuit preventing battery from over discharging of the present invention shown in FIG. 7, even the output voltage of the battery BAT 701 increases transitionally, the first n type MOS transistor 703 does not become on. Therefore the drain current of the second n type MOS transistor 705 does not flow, as a result, the useless discharging from the battery BAT 701 is able to be prevented.

In this, at the above mentioned the fourth and the fifth embodiments, the relation of values of the gate cut voltage of the first n type MOS transistor and the second n type MOS transistor is the same as the p type MOS transistors in an absolute value.

As mentioned above, the present invention is able to prevents the battery from over discharging to the empty state, therefore the circuit preventing battery from over discharging making the battery life long is able to be provided.

Moreover, even the discharging is continued in long time, the over discharging is avoided, therefore at the time of recharging, the recharging time is able to be shortened.

Furthermore, at the case that the power supply state is indicated by LED, even the power supply to the DC/DC converter stops by the discharging of the battery, the transitional increase and decrease of the battery voltage is not repeated and the flashing of LED is able to be prevented.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A circuit preventing battery from over discharging which works at an input stage of a DC/DC converter operated by a rechargeable battery, comprising:

a first p type MOS transistor whose gate cut voltage is V1 and whose source is connected to the positive electrode of said battery and whose gate is connected to the negative electrode of said battery;

a second p type MOS transistor whose gate cut voltage is V2 and V2<V1 and whose source is connected to the positive electrode of said battery and whose gate is connected to the negative electrode of said battery;

a current detecting means which connects to the drain of said first p type MOS transistor and the gate of said first p type MOS transistor; and a switching means which connects to the drain of said first p type MOS transistor and the drain of said second p type MOS transistor and becomes on state at the time when a current flows into said current detecting means.

2. A circuit preventing battery from over discharging in accordance with claim 1, wherein:

said current detecting means provides a light emitting section of photocoupler; and said switching means provides a light receiving section of photocoupler which becomes on state by a light emission at the time when a current flows into said light emitting section of photocoupler.

3. A circuit preventing battery from over discharging in accordance with claim 1, wherein:

said current detecting means provides an electromagnet of a relay; and said switching means provides a mechanical contact of a relay which becomes on state at the time when a current flows into said electromagnet of the relay.

4. A circuit preventing battery from over discharging in accordance with claim 1, wherein:

the gate cut voltage V1 of said first p type MOS transistor is larger than the output voltage V of said battery at the case that the discharge current of said battery stops and the voltage drop caused by an internal resistance stops and the output voltage increases transitionally.

5. A circuit preventing battery from over discharging which works at an input stage of a DC/DC converter operated by a rechargeable battery, comprising:

a first p type MOS transistor whose gate cut voltage is V1 and whose source is connected to the positive electrode of said battery and whose gate is connected to the negative electrode of said battery;

a second p type MOS transistor whose gate cut voltage is V2 and V2<V1 and whose gate is connected to the negative electrode of said battery and whose drain is connected to the drain of said first p type MOS transistor;

a current detecting means which connects to the drain of said first p type MOS transistor and the gate of said first p type MOS transistor; and a switching means which connects to the source of said first p type MOS transistor and the source of said second p type MOS transistor and becomes on state at the time when a current flows into said current detecting means.

6. A circuit preventing battery from over discharging in accordance with claim 5, wherein:

said current detecting means provides a light emitting section of photocoupler; and said switching means provides a light receiving section of photocoupler which becomes on state by a light emission at the time when a current flows into said light emitting section of photocoupler.

7. A circuit preventing battery from over discharging in accordance with claim 5, wherein:

said current detecting means provides an electromagnet of a relay; and said switching means provides a mechanical contact of a relay which becomes on state at the time when a current flows into said electromagnet of the relay.

8. A circuit preventing battery from over discharging in accordance with claim 5, wherein:

the gate cut voltage V1 of said first p type MOS transistor is larger than the output voltage V of said battery at the case that the discharge current of said battery stops and the voltage drop caused by an internal resistance stops and the output voltage increases transitionally.

9. A circuit preventing battery from over discharging which works at an input stage of a DC/DC converter operated by a rechargeable battery, comprising:

a first n type MOS transistor whose gate cut voltage is V1 and whose source is connected to the negative electrode of said battery and whose gate is connected to the positive electrode of said battery;

a second n type MOS transistor whose gate cut voltage is V2 and V2<V1 and whose gate is connected to the positive electrode of said battery and whose source is connected to the negative electrode of said battery;

a current detecting means which connects to the drain of said first n type MOS transistor and the gate of said first n type MOS transistor; and a switching means which connects to the drain of said first n type MOS transistor and the drain of said second n type MOS transistor and becomes on state at the time when a current flows into said current detecting means.

10. A circuit preventing battery from over discharging in accordance with claim 9, wherein:

said current detecting means provides a light emitting section of photocoupler; and said switching means provides a light receiving section of photocoupler which becomes on state by a light emission at the time when a current flows into said light emitting section of photocoupler.

11. A circuit preventing battery from over discharging in accordance with claim 13, wherein:

said current detecting means provides an electromagnet of a relay; and said switching means provides a mechanical contact of a relay which becomes on state at the time when a current flows into said electromagnet of the relay.

12. A circuit preventing battery from over discharging in accordance with claim 13, wherein:

the gate cut voltage V1 of said first n type MOS transistor is larger than the output voltage V of said battery at the case that the discharge current of said battery stops and the voltage drop caused by an internal resistance stops and the output voltage increases transitionally.

13. A circuit preventing battery from over discharging which works at an input stage of a DC/DC converter operated by a rechargeable battery, comprising:

a first n type MOS transistor whose gate cut voltage is V1 and whose source is connected to the negative electrode of said battery and whose gate is connected to the positive electrode of said battery;

a second n type MOS transistor whose gate cut voltage is V2 and V2<V1 and whose gate is connected to the positive electrode of said battery and whose drain is connected to the drain of said first n type MOS transistor;

a current detecting means which connects to the drain of said first n type MOS transistor and the gate of said first n type MOS transistor; and a switching means which connects to the source of said first n type MOS transistor and the source of said second n type MOS transistor and becomes on state at the time when a current flows into said current detecting means.

14. A circuit preventing battery from over discharging in accordance with claim 13, wherein:

said current detecting means provides a light emitting section of photocoupler; and said switching means provides a light receiving section of photocoupler which becomes on state by a light emission at the time when a current flows into said light emitting section of photocoupler.

15. A circuit preventing battery from over discharging in accordance with claim 13, wherein:

said current detecting means provides an electromagnet of a relay; and said switching means provides a mechanical contact of a relay which becomes on state at the time when a current flows into said electromagnet of the relay.

16. A circuit preventing battery from over discharging in accordance with claim 13, wherein:

the gate cut voltage V1 of said first n type MOS transistor is larger than the output voltage V at the case that the discharge current of said battery stops and the voltage drop caused by an internal resistance stops and the output voltage increases transitionally.

* * * * *